Feb. 14, 1956 G. M. CUNNINGHAM 2,734,647
CARTON UNLOADING MACHINE
Filed March 24, 1953 2 Sheets-Sheet 2
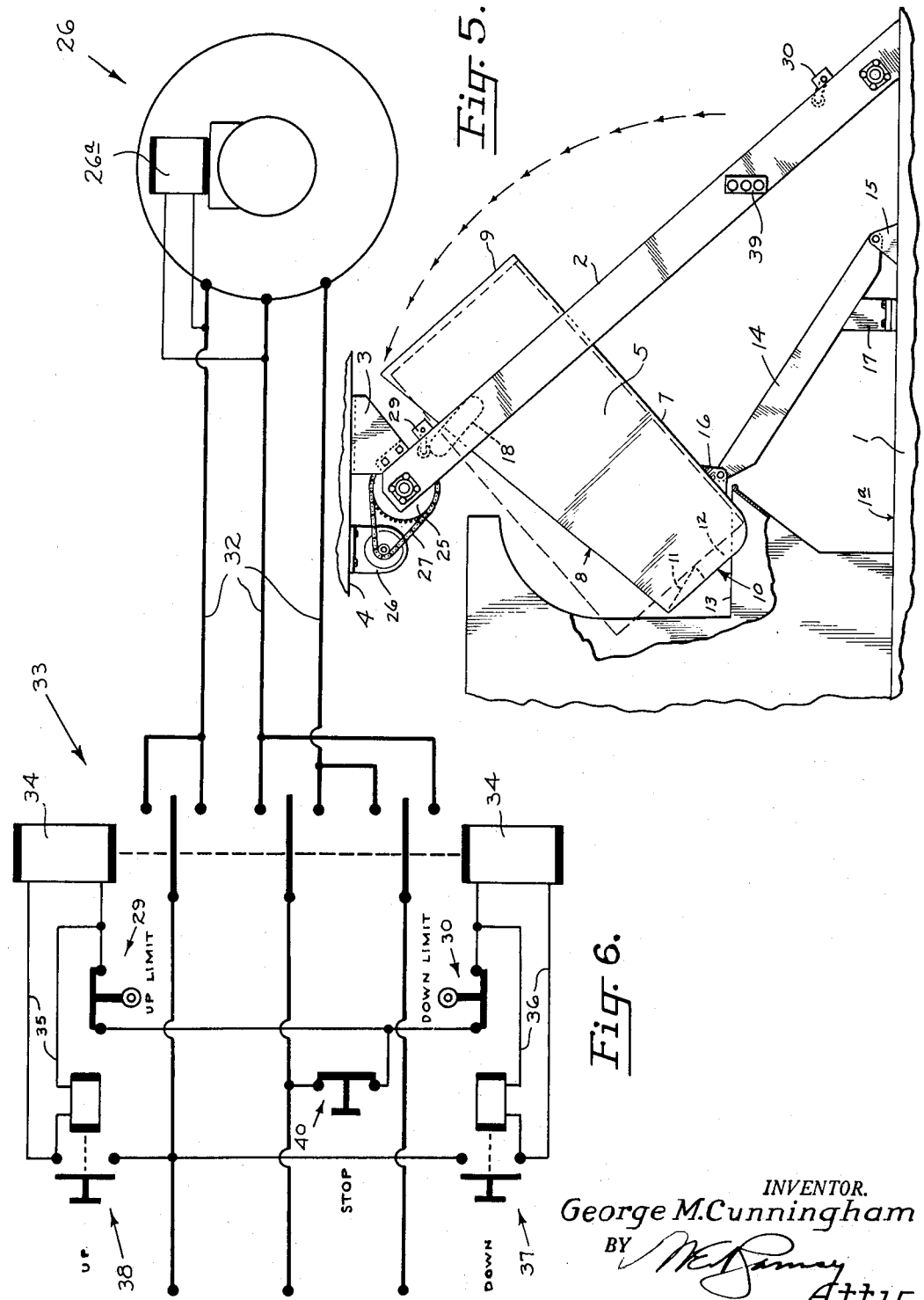
INVENTOR.
George M. Cunningham
BY
Atty.

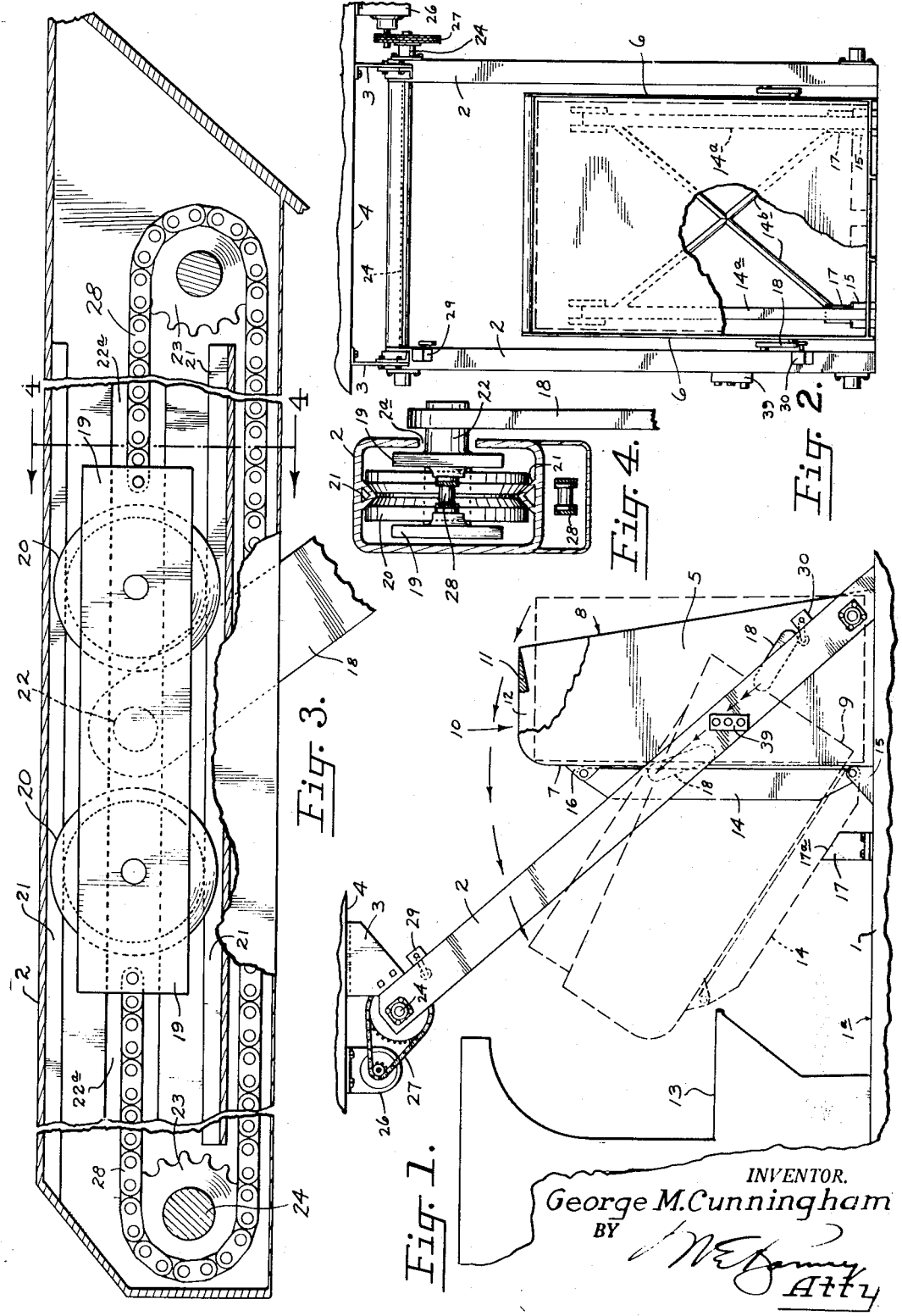

United States Patent Office 2,734,647
Patented Feb. 14, 1956

2,734,647

CARTON UNLOADING MACHINE

George M. Cunningham, Portland, Oreg., assignor to American Metal Works, Inc., Portland, Oreg., a corporation of Oregon Application March 24, 1953, Serial No. 344,344

7 Claims. (Cl. 214—313)

My invention relates to carton unloading devices, and has particular use in discharging bulk packed flour for use in bakeries and the like. Large users of flour have found that decided economies can be effected, both in packaging and in storing, by using large, rectangular-shaped cardboard cartons of flour. They are adapted to discharge flour through one end of the carton, and the lifting and upending of such large cartons involves the moving of substantial masses. Frequently, said unloading devices have to be supported upon floors with frame under structures and thus it is essential that they work smoothly so as not to set up jarring stresses within the floors and framework of buildings.

Another factor which is important is that said unloading devices must operate under close control, so that there will not be any substantial quantities of airborne dust generated by said dumping action, and so that said unloading devices will present few corners or ledges upon which airborne flour may lodge and accumulate. Said unloading devices have to be easily accessible to receive cartons to be dumped and to have empty cartons removed therefrom. Thus, in loading position, they should be at floor level, readily to receive cartons to be dumped. In dumping position, they must be elevated so that the pouring end is elevated above a hopper, such as the mouth of a blender.

Within these operating conditions, it is the object of my invention to provide an unloading device in which the weight thereof and the masses which it supports are carried close to the floor or base thereof, not only to limit the stresses to which the structural members of said unloading devices would otherwise be subject, but also to limit any vibration which might result from supporting said massive cartons in the air.

A further object of my invention is to provide an unloading device which operates smoothly, is provided with adequate safety devices, and is of a design to avoid industrial hazards, one which minimizes accidental injuries to the operator, and one which moves the carton under close control at all positions from filling to dumping positions in making an operating cycle.

Further and other details of my invention are hereinafter described in connection with the accompanying drawings, in which:

Fig. 1 is a side elevation of a carton unloading device embodying my invention, with portions shown broken away to disclose details thereof and with some portions shown in dotted outline to indicate the movement of the tipple thereof from loading to its first articulation, proceeding toward dumping position;

Fig. 2 is an end view of said carton unloading device, with the closed face of the tipple shown broken away to disclose details of the link frame member with which said tipple is associated;

Fig. 3 is a foreshortened view of one of the obliquely disposed guideways, portions being shown broken away and in section to disclose details of the driving connections for moving said tipple;

Fig. 4 is a transverse section taken on the line 4—4 in Fig. 3, showing details of the guideways, cross head and link construction which control and limit the lifting and tipping action of said tipple;

Fig. 5 is an elevation similar to Fig. 1, indicating the discharge position of said carton unloader and indicating by arrows the circular path described by the floor of said tipple moving toward discharge position; and Fig. 6 is an electrical diagram illustrating the electric motor and controls for said mechanism.

A carton unloader embodying my invention comprises a base 1 having an upper face 1a arranged substantially at floor level when installed. Extending obliquely upwardly from said base are a pair of obliquely disposed guide members 2. The upper ends of said guide members are joined to brackets 3, carried by a ceiling or other elevated support 4. Lying between said guide members is an elongated, rectangular tipple 5. This has two closed sides 6, a closed face 7, an open face 8, a closed floor 9, and an apertured upper end 10. Said upper end has a transverse bar 11 extending between the two sides thereof. As is shown in Fig. 1, said bar occupies only a portion of said open end, and between it and the closed face a discharge opening 12 is defined.

Cartons of flour of corresponding shape are adapted to be inserted in said tipple on end. The tipple corresponds more or less in its interior dimensions to the exterior dimensions of said carton. The carton is indicated in dotted outline in Fig. 1 with relation to said tipple. The face 8 is open along its entire length, so that a carton may be placed therein by a fork truck which can operate along the floor, through said open face, and deposit it upon the floor 9, while supported by a pallet or other handling device. Because said tipple does not rock forwardly, that is clockwise as viewed in Fig. 1, there is no necessity for securing said carton against tipping forward. It is common practice to form said cartons with portions at their tops, as is viewed in Fig. 1, which may be cut to define a pouring opening. Said pouring opening is aligned and in register with the discharge opening in the tipple when the tipple is lifted and upended to the position it occupies in Fig. 5. The closed sides, floor, and one face tend to prevent said carton from shifting in said tipple, and the bar 11 prevents it from falling out of the apertured upper end 10 when said tipple is upended.

It is common to dump said cartons into the hopper of a blender, for example, such as is indicated at 13 in Figs. 1 and 5. The mouth of said hopper is elevated substantially above the base, and thus said carton must be lifted and upended to discharge the contents thereof into said hopper. Said carton unloading device might thus be said to define two stations with regard to the carton; namely, a filling station, such as is indicated in Fig. 1, in which the carton may be inserted into the open mouth of the tipple, and a discharge station in which said carton is lifted and upended to a position overlying the mouth of said blender. Said stations are spaced apart both laterally and vertically, as is shown in the drawings.

Overlying the guide members 2 is a link frame member 14. It is pivotally joined at its lower end upon journal brackets 15 carried by the base 1. It is joined at its upper end to clips 16 secured to the closed face of the tipple. Both of the points of joinder of said link frame member with the brackets and said clips permit ready articulation about axes normal to the longitudinal dimension thereof. Underlying said link frame member when it is inclined is a chock member 17, which has an inclined or sloping upper face 17a. It lies intermediate the filling station and the discharge station; that is, it lies between the lower end of the guide members 6 and the hopper of a blender 13. As is shown in Fig. 5, when the tipple is raised, the link frame member is rocked counterclockwise about its journal connection with brackets 15 until it lies across said sloping upper face 17 of the chock, and this limits rotation of said link frame member in a counterclockwise direction.

Also joined to said tipple is a pair of link members 18. Their lower ends are pivotally joined to the sides of said tipple at a point adjacent the floor thereof and also near the open face thereof. Their upper ends are joined to a crosshead 19, as is shown in Fig. 3, which traverses the major portion of the longitudinal dimension of guide members 2. There is a crosshead in each of said guide members, and each crosshead is pivotally joined to a link member 18, which, in turn, is secured at its lower end to a pivot connection with the side of a tipple. Said crosshead members carry two track engaging rollers 20 which are spaced apart, and in journal connection between the link members and the crosshead is arranged substantially equidistant between them. I arrange two spaced track members 21 within each guide member. Said track members preferably are of triangular section and the periphery of each track engaging roller is complementary therewith. I choose triangular track members because they produce better self-centering and easier running surfaces for the track engaging rollers. Said track members extend substantially the entire length of the guide members 2. At least they are sufficiently long so that they will accommodate movement of the crossheads from a position indicated when the tipple is arranged vertically and in loading position, as is shown in full lines in Fig. 1, to a position where the tipple is elevated into discharge position, as in Fig. 5.

Said guide members preferably are smooth surfaced beams of C-shaped section, as is shown in Fig. 4. They are provided with a slot 2a through which a trunnion 22 extends, which trunnion is carried by the upper end of a link member 18. Only sufficient clearance is provided by said slot to permit uninterrupted movement of said trunnion as it traverses the length of said slot. Also housed within said guide member is a pair of sprockets 23 arranged at the ends of the guide members. The sprocket at one end is an idler and at the other end is a driven sprocket. As is shown in Figs. 1 and 5, the driven sprocket preferably is at the upper end of the guide members and is carried upon a drive shaft 24, carrying a larger sprocket 25 which is driven by an electric motor 26 through drive chain 27. Extending about the sprockets 23 is a length of chain 28, the ends of which are joined to the ends of the crosshead 19. Longitudinal courses are defined within said guide members to accommodate the runs of said chain 28, and the ends of the guide members are beveled to accommodate their upper and lower joining members.

It is to be understood that the motor and chain drive is merely illustrative of one type of operating mechanism and is not to be considered as the only specific form which my invention might take. It is a simple structure and easily illustrated and described. Also carried by said guide members are limit switches 29 and 30. Limit switch 29 is the upper switch and limit switch 30 is the lower switch. These may take any form and are actuated by the tipple or some associated part thereof to limit the extreme limits of movement of said tipple and its parts up and down said guideway.

In Fig. 6, I illustrate by electrical diagram the driving device and electrical controls therefor. As is shown in said diagram, a reversible electric motor 26 receives its power through lines 32 leading to some source such as power lines. I provide a reversing switch 33, preferably actuated by electro-magnetic controls 34. In the circuit 35, which includes the coils for said electro-magnetic controls, is the up limit switch 29, and in the circuit 36 leading to the other electro-magnetic control is the lower limit switch 30. Thus, when the upper limit switch is broken by contact with the tipple or its operating parts, it will cut off the electric power to the motor and will stop further movement of said tipple. Then the motor may be operated only by closing the down switch 37 to operate the motor. Likewise, when the down limit switch is actuated, it breaks the circuit to the motor and said motor may be energized only by closing the up button 38. Said buttons are preferably arranged in a panel 39 carried by one of the guide members 2, so as to be readily accessible to the operator. In addition, I have provided an emergency switch which breaks all electric circuits to the motor 26. I also provide an electro-magnetic brake 26a for said motor 26 to prevent creeping.

My carton unloading machine operates as follows:

When a carton of flour is to be dumped into the hopper of a blender, it is usually carried discharge end up by a lift truck or other conveyance which places the carton in position in the tipple, passing it through the open face thereof. Prior to inserting it in said tipple, the pouring aperture of the carton is formed so that it will discharge its contents when it is upended. Then the up button is pushed and the tipple moves up the guide members 2. Due to the arrangement of the link frame member 14, the first motion is to tip the tipple and the carton carried therein counterclockwise along the course indicated by dotted arrows in Fig. 1. That is to say, the tipple rocks counterclockwise about the journal connections joining the lower end of the link frame member with elements 15 carried by the base. This continues until said tipple assumes the position shown in dotted outline in Fig. 1, with said link frame member resting upon the upper face 17a of the chock 17. Continued movement of the crossheads along the guide members causes the lower end of the tipple to be elevated following the path indicated by arrows in Fig. 5. This is carried along until the bottom of the carton is upended sufficiently so that the contents of said carton will flow out through the open end of the tipple and into the hopper for the blender. After said carton has been emptied, the down button is pushed and said parts operate in reverse cycle. As can be noted, the weight of the tipple and the massive carton of flour carried thereby is generally supported in all positions by the link frame member 14. During the first portion of the unloading operation, said parts are supported upon the journal connection between the link frame member and its journal members 15. Thereafter, said link frame member, resting upon the chocks, provides support while said tipple moves along the remainder of its path.

Although the guide members are required to lift a portion of the weight of said tipple and the carton of flour carried therein, it is only a small portion thereof; that is, only a sufficient amount of weight is supported by said guide members, first to tip the tipple over until it lies flatwise upon the link frame member 14 and, thereafter, only to lift the lower end to cause it to be upended to the position shown in Fig. 5. Said link frame member comprises a pair of arms 14a, which are spaced apart and joined by cross bracing 14b extending diagonally between said arms. The cross bracing members are joined together, and thus a strong bracing structure is built into the link frame member to resist distortion and to provide adequate support for the loads carried thereby.

I preferably arrange sheeting and vertical posts across the space between each of the guide members and the base. This serves in part as the vertical support for said guide members and in part to prevent anything from lodging under the tipple while it is being lifted and upended. It is not illustrated in the drawings because it would conceal the operating parts of my machine.

I claim:

1. A carton unloading machine, comprising a horizontally disposed base defining a filling station, a discharge station mounted vertically above said base but spaced laterally from said filling station, a pair of obliquely disposed guide members extending laterally up from said base, a rectangular rigid tipple having an open face and a closed face arranged intermediate said guides, a link frame member pivotally joined at one end to said base and at the other end to said tipple, said link frame member being pivotally joined to the closed face of said tipple adjacent one end thereof, and means for pivoting said tipple about said other end of the link frame member.

2. A carton unloading machine, comprising a horizontally disposed base defining a filling station, a discharge station mounted vertically above said base but spaced laterally from said filling station, a pair of obliquely disposed guide members extending laterally up from said base, a rectangular rigid tipple having an open face and a closed face arranged intermediate said guides, a link frame member pivotally joined at one end to said base and at the other end to said tipple, said link frame member being pivotally joined to the closed face of said tipple adjacent one end thereof, and drive means housed within each of said guide members and joined to said tipple at points spaced from the joinder point of said tipple and link frame for pivoting said tipple about said joinder point.

3. A carton unloading machine, comprising a horizontally disposed base defining a filling station, a discharge station mounted vertically above said base but spaced laterally from said filling station, a pair of obliquely disposed guide members extending laterally up from said base, a rectangular rigid tipple having an open face and a closed face arranged intermediate said guides, a link frame member pivotally joined at one end to said base and at the other end to said tipple, said link frame member being pivotally joined to the closed face of said tipple adjacent one end thereof, drive means housed within each of said guide members including a longitudinally movable crosshead member, guideways defined within each of said guide members extending longitudinally of the latter, and defining an operating path along which each crosshead reciprocates, and a pair of connecting links each joining a crosshead with the adjacent side of said tipple near the open face thereof and adjacent the end opposite the end to which said link is joined.

4. A carton unloading machine, comprising a horizontally disposed base defining a filling station, a discharge station mounted vertically above said base but spaced laterally from said filling station, a pair of obliquely disposed guide members extending laterally up from said base, a rectangular rigid tipple having an open face and a closed face arranged intermediate said guides, a link frame member pivotally joined at one end to said base and at the other end to said tipple, said link frame member being pivotally joined to the closed face of said tipple adjacent one end thereof, drive means housed within each of said guide members including a longitudinally movable crosshead member, guideways defined within each of said guide members extending longitudinally of the latter, and defining an operating path along which each said crosshead reciprocates, and a pair of connecting links each joining a crosshead with the adjacent side of said tipple near the open face thereof and adjacent the end opposite the end to which said link is joined, and a chock carried by said base at a point intermediate said filling station and said dumping station, whereby when said drive means moves a crosshead upwardly along its oblique guide means said tipple is moved from the filling station, is tipped backwardly against said chock and then is lifted and upended along a circular path having as its center of radius the pivotal connection between the link frame member and said tipple.

5. A carton unloading machine, comprising a horizontally disposed base defining a filling station, a discharge station mounted vertically above said base but spaced laterally from said filling station, a pair of obliquely disposed guide members extending laterally up from said base, a rectangular rigid tipple having an open face and a closed face arranged intermediate said guides, a link frame member pivotally joined at one end to said base and at the other end to said tipple, said link frame member being pivotally joined to the closed face of said tipple adjacent one end thereof, said tipple having a discharge end partially closed by a transverse package retaining bar spaced from said closed face to define a pouring aperture, and means for pivoting said tipple about said other end of the link frame member.

6. A carton unloading machine, comprising a horizontally disposed base defining a filling station, a discharge station mounted vertically above said base but spaced laterally from said filling station, a pair of obliquely disposed guide members extending laterally up from said base, a rectangular rigid tipple having an open face and a closed face arranged intermediate said guides, a link frame member pivotally joined at one end to said base and at the other end to said tipple, said link frame member being pivotally joined to the closed face of said tipple adjacent one end theerof, said tipple having a discharge end a pair of spaced arms joined rigidly by cross bracing spanning diagonally the space between said arms, and means interconnecting said tipple and guide members but spaced laterally from the joinder point of said tipple and link frame for pivoting said tipple about said joinder point as said tipple approaches said discharge station.

7. A carton unloading machine, comprising a horizontally disposed base defining a filling station, a discharge station mounted vertically above said base but spaced laterally from said filling station, a pair of obliquely disposed guide members extending laterally up from said base, a rectangular rigid tipple having an open face and a closed face arranged intermediate said guides, a link frame member pivotally joined at one end to said base and at the other end to said tipple, said link frame member being pivotally joined to the closed face of said tipple adjacent one end thereof, drive means housed within each of said guide members including a longitudinally movable crosshead member, guideways defining within each of said guide members extending longitudinally of the latter, and defining an operating path along which each crosshead reciprocates, a pair of connecting links each joining a crosshead with the adjacent side of said tipple near the open face thereof and adjacent the end opposite the end to which said link is joined, a chock carried by said base at a point intermediate said filling station and said dumping station, whereby when said drive means moves a crosshead upwardly along its oblique guide means said tipple is moved from the filling station, is tipped backwardly against said chock and then is lifted and upended along a circular path having as its center of radius the pivotal connection between the link frame member and said tipple, said crosshead having a pair of spaced way engaging rollers spaced apart longitudinally and having a link engagement lying between them.

References Cited in the file of this patent

UNITED STATES PATENTS

| | | |
|---|---|---|
| 950,122 | Smith | Feb. 22, 1910 |
| 1,775,983 | Weber | Sept. 16, 1930 |
| 2,478,055 | Redington | Aug. 2, 1949 |
| 2,522,588 | Sutherland | Sept. 19, 1950 |